(12) United States Patent
Andersen et al.

(10) Patent No.: US 8,678,736 B2
(45) Date of Patent: Mar. 25, 2014

(54) VEHICLE BRACES HAVING A TRACK-CLAMPING MECHANISM

(75) Inventors: Jonathan Andersen, Racine, WI (US); Norbert Hahn, Franklin, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 285 days.

(21) Appl. No.: 12/752,636

(22) Filed: Apr. 1, 2010

(65) Prior Publication Data
US 2011/0243694 A1 Oct. 6, 2011

(51) Int. Cl.
*B65G 67/00* (2006.01)

(52) U.S. Cl.
USPC .......................................................... 414/401

(58) Field of Classification Search
USPC .............. 414/271, 401, 652; 182/36, 72, 240, 182/141; 187/351, 370, 372; 188/8, 24.12, 188/24.22
See application file for complete search history.

(56) References Cited

U.S. PATENT DOCUMENTS

| | | | |
|---|---|---|---|
| 4,262,777 A * | 4/1981 | Christopher | 187/253 |
| 4,469,198 A * | 9/1984 | Crump | 182/141 |
| 5,648,644 A * | 7/1997 | Nagel | 187/288 |
| 6,193,026 B1 * | 2/2001 | Sevilleja et al. | 188/153 R |
| 6,322,310 B1 * | 11/2001 | Bender et al. | 414/401 |
| 6,431,819 B1 | 8/2002 | Hahn | |
| 6,488,464 B1 | 12/2002 | Kish | |
| 6,817,443 B1 * | 11/2004 | Metz | 182/82 |
| 7,384,229 B2 * | 6/2008 | Gleason | 414/401 |
| 2007/0248440 A1 | 10/2007 | Andersen et al. | |

FOREIGN PATENT DOCUMENTS

| | | |
|---|---|---|
| GB | 990042 | 4/1965 |
| GB | 2105802 | 3/1983 |

OTHER PUBLICATIONS

Canadian Intellectual Property Office, "Office Action," issued in connection with application serial No. 2,735,382, issued Apr. 18, 2012, 4 pages.
Canadian Intellectual Property Office, "Office Action," issued in connection with application serial No. 2,735,382, issued Dec. 12, 2012, 4 pages.

* cited by examiner

*Primary Examiner* — Saul Rodriguez
*Assistant Examiner* — Glenn Myers
(74) *Attorney, Agent, or Firm* — Hanley, Flight & Zimmerman, LLC

(57) ABSTRACT

An example of a vehicle brace for use at a loading dock includes a vehicle support member that can travel to various heights along a vertical track. The support member exerts a substantial but limited resistive force up against the underside of a vehicle's rear impact guard to mitigate bouncing of the vehicle's truck or trailer bed as the vehicle is being loaded and/or unloaded of its cargo. Of particular interest in some examples is a rather short brake actuator mounted at an angle to create an inclined binding clamp action, the actuator being installed to travel with the vehicle support member, and the track having an inclined braking surface so that the brake's clamping force does not rely on friction alone, all of which provides for a compact vehicle brace installable as a self-contained unit and operated without having to rely on structural support from a driveway surface.

25 Claims, 9 Drawing Sheets

VEHICLE BRACES HAVING A TRACK-CLAMPING MECHANISM

FIELD OF THE DISCLOSURE

The subject disclosure generally pertains to restraining a vehicle at a loading dock and, more specifically, to vehicle braces having a track-clamping mechanism.

BACKGROUND

A typical truck loading dock of a building includes an exterior doorway with an elevated platform for loading and unloading vehicles such as trucks and trailers. Many loading docks have a dock leveler to compensate for height differences between the loading dock platform and an adjacent bed of the truck or trailer. A typical dock leveler includes a deck, also known as a ramp or dockboard, which is pivotally hinged along a back edge to vary the height of a front edge. An extension plate, or lip, extends outward from the deck's front edge to span the gap between the rear of the trailer bed and the front edge of the deck. Extending from the deck's front edge, the lip rests upon the truck bed to form a bridge between the deck and the bed. This allows personnel and material handling equipment, such as a forklift truck, to readily move on and off the vehicle during loading and unloading operations.

When a forklift drives over the dock leveler and onto the trailer bed, the weight of the forklift and/or the cargo it may be carrying can add a significant load to the truck bed. Likewise, when the forklift exits the truck bed, weight is removed from the trailer. Thus, the load carried by the trailer changes repeatedly during the loading/unloading process. The trailer's suspension may respond to these load changes by allowing the trailer to raise and lower accordingly.

Unfortunately, the resulting vertical movement of the trailer can create some problems. For instance, the rear or side edges of the trailer usually engage some type of dock seal that is mounted at a generally fixed location along the doorway of the dock, so vertical movement of the trailer can wear out the seal. Also, a forklift suddenly descending upon entering the trailer can be disconcerting to the forklift driver. Such movement of the trailer becomes worse when the trailer has an air suspension system.

With air suspension, air-pressurized bladders support the weight of the trailer and its cargo. Air suspension systems typically include an air compressor, a holding tank, and various control valves that cooperate to add or release a controlled amount of air from the bladders to help maintain the trailer at a certain height. So, when a forklift enters the trailer, pressurized air is forced into the bladders to compensate for the forklift's added weight. Due to the suspension system's delayed response time, however, the trailer may initially sink or lower when the forklift first enters and later rise back up toward its intended height before the forklift departs. Then, when the forklift leaves and removes its weight from the trailer, the recently added air in the bladders lifts the trailer to an elevation that is greater than its designed height. The system compensates for the overshoot by releasing some air from the bladders until the trailer settles back down to its original height. This down/up cycle of the trailer repeats itself with every load the forklift takes on and/or off the trailer. Compared to other suspension systems, air suspensions usually provide much greater vertical movement.

To eliminate the repeated movement of the trailer, an air suspension system may simply dump or completely exhaust the air from the bladders before the loading or unloading process begins. This causes the trailer to descend until the suspension system bottoms out, whereby the suspension becomes inactive, and the trailer remains at its bottomed out position while the trailer is loaded or unloaded of its cargo. Although this may correct the problems associated with movement of the trailer during loading and unloading, the low position of the trailer bed can create another problem. For the dock leveler to reach such an extremely low trailer bed, the deck may need to be set at such a steep incline that it may be difficult for the forklift to travel across the deck.

Some loading docks may have a vehicle restraint that helps prevent a truck or trailer from accidentally pulling away from the dock. Such vehicle restraints usually include a hook or barrier that reaches up in front of the vehicle's RIG (rear impact guard) or ICC bar. Instead of inhibiting vertical movement of the vehicle during its loading or unloading, these vehicle restraints do just the opposite; they accommodate or allow the vehicle the freedom to move vertically. One such known restraint includes a spring that compresses with downward force exerted by an ICC bar. Similarly, the vehicle restraint includes a pressure relief valve that can be set to hold the weight of the restraint itself, but the relief valve is not meant to inhibit the downward movement of the vehicle.

In some examples, a solid, immovable support structure, such as a hydraulic jack, could be placed underneath the ICC bar to completely eliminate any vertical movement of the vehicle and/or actually lift the vehicle. However, such a support structure could result in an excessive upward reactive force being applied to the ICC bar and the underside of the trailer bed to which the bar is attached. More specifically, if the trailer bed were held stationary, any added weight of cargo and/or the weight of a forklift entering the trailer would be transmitted through the ICC bar and to the frame, neither of which may be designed to support such loads. Thus, holding the trailer bed completely immovable could damage the ICC bar and/or other parts of the trailer.

DETAILED DESCRIPTION

Figure 3:
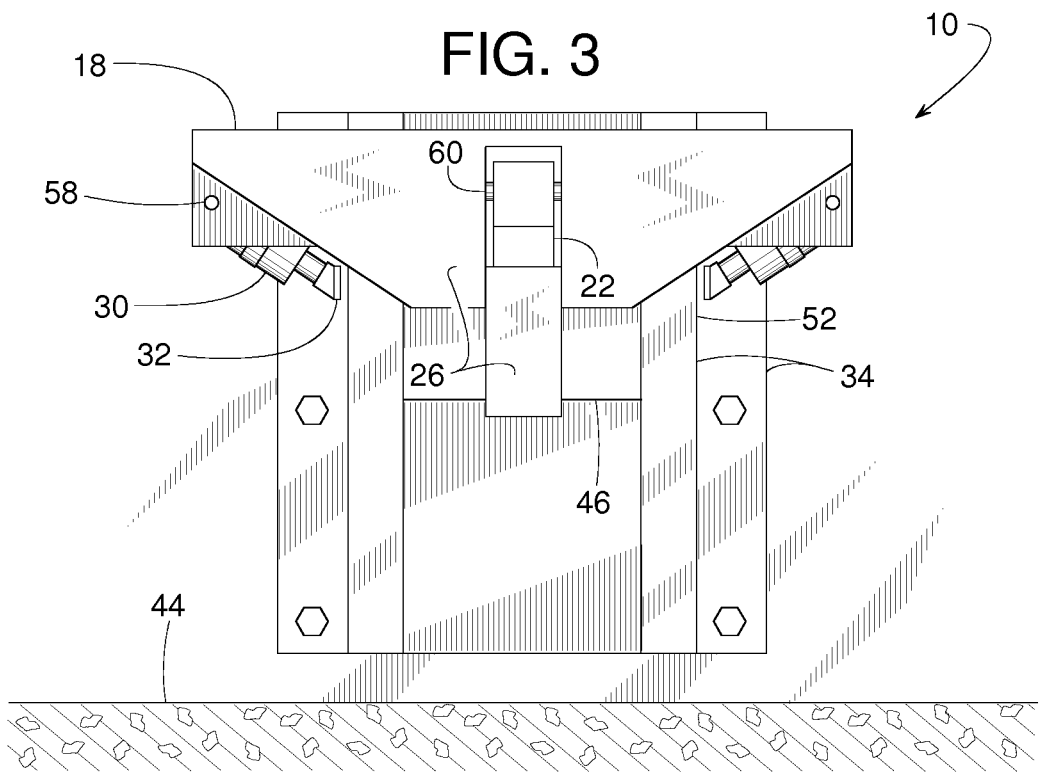
FIG. 3 is a front view of FIG. 1.
Figure 4:
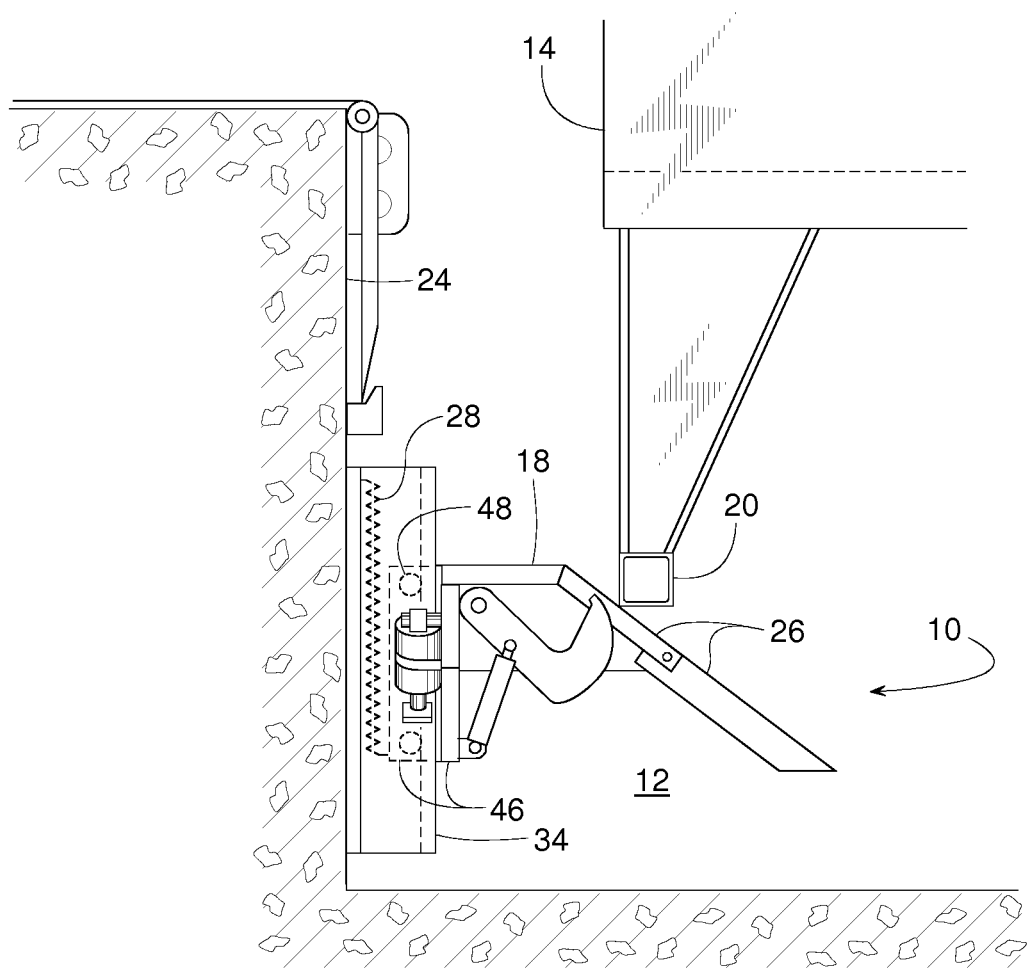
FIG. 4 is a side view similar to FIG. 1 but showing a vehicle moving the example vehicle support member toward an operative position.
Figure 5:
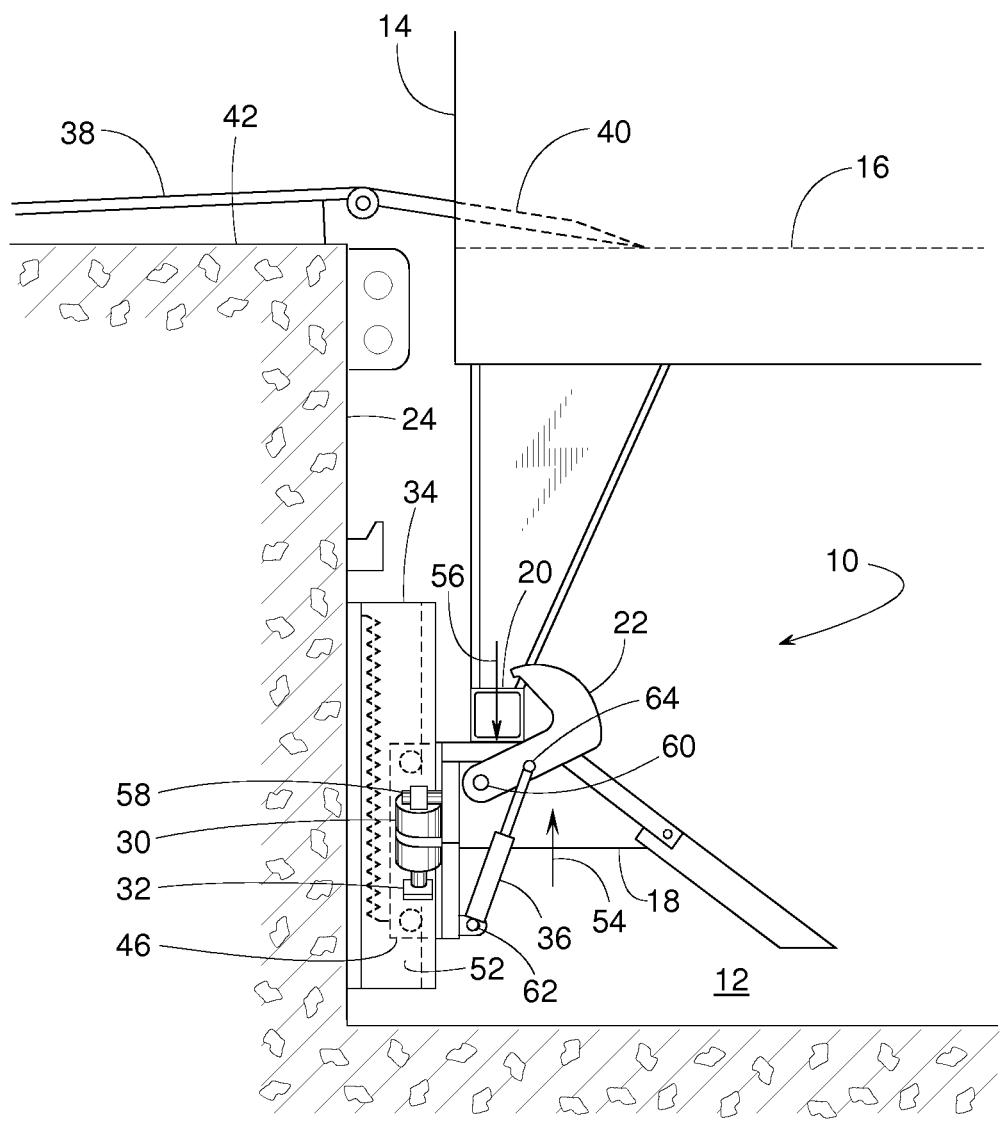
FIG. 5 is a side view similar to FIGS. 1 and 4 but showing the vehicle support member in the operative position.

FIGS. 1-6 show an example vehicle brace 10 installed at a truck loading dock 12 where a vehicle 14 can have its cargo loaded and/or unloaded from a rear end of the vehicle's truck or trailer bed 16. When vehicle 14 is backed into dock 12, as shown in FIG. 5, a vehicle support member 18 of brace 10 engages and helps support the underside of the vehicle's rear impact guard 20 (also known as a RIG or ICC bar). Brace 10 effectively disables or resists the vehicle's suspension to inhibit rapid vertical movement of the rear end of vehicle 14 in response to weight being repeatedly added and/or removed from bed 16.

Figure 6:
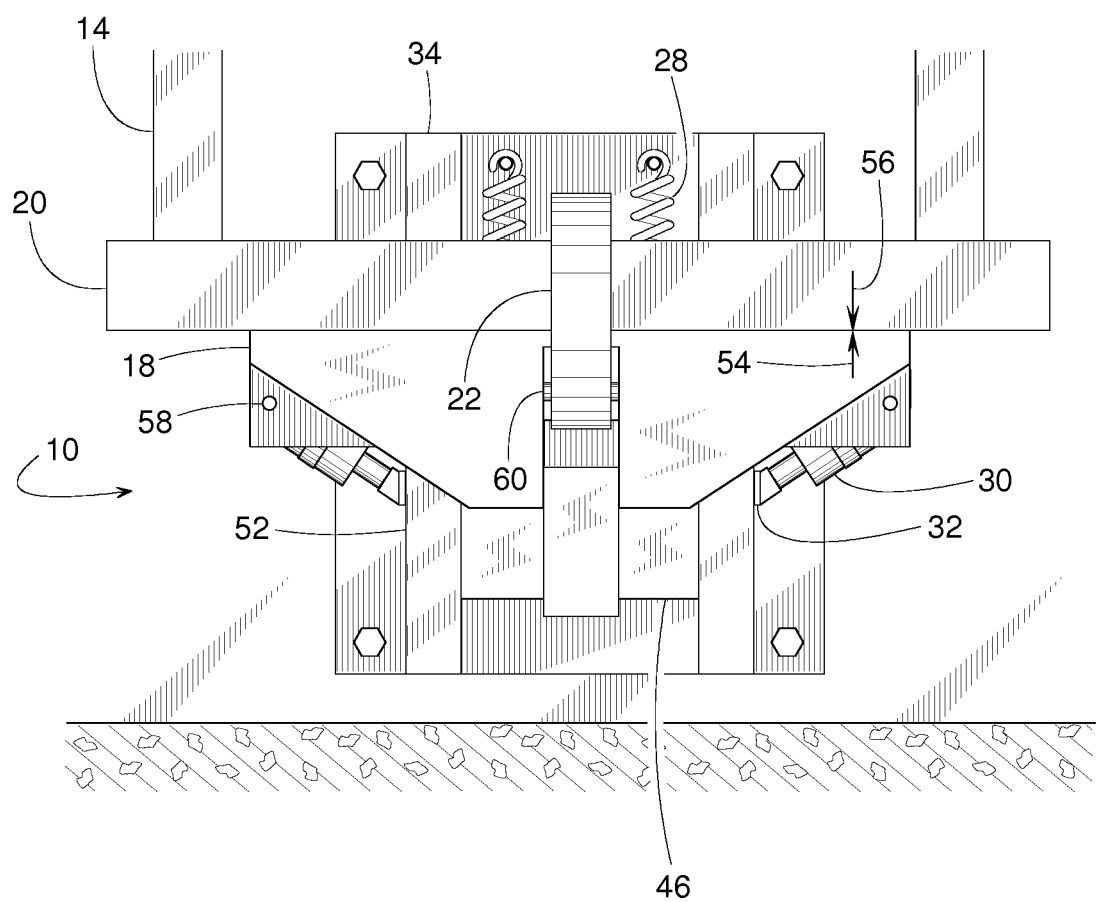
FIG. 6 is a front view of FIG. 5.
Figure 7:
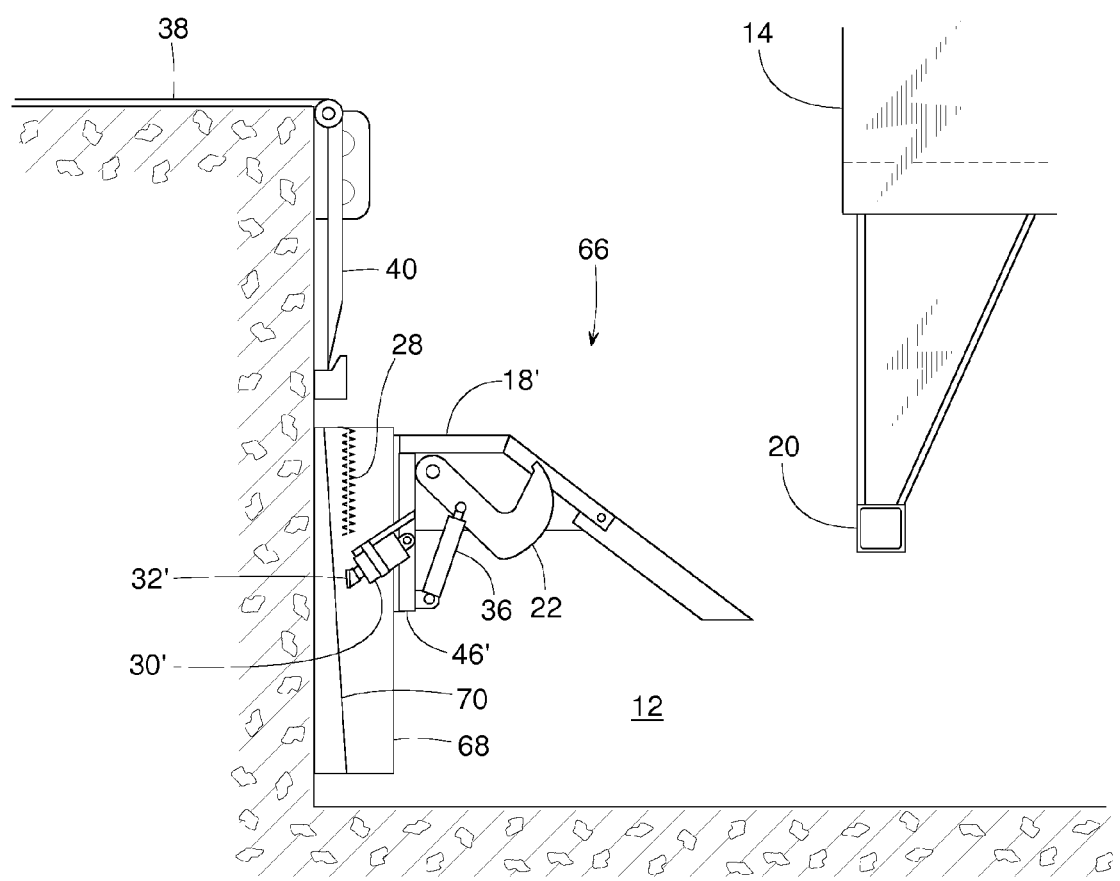
FIG. 7 is a side view similar to FIG. 1 but showing another example vehicle brace disclosed herein.
Figure 8:
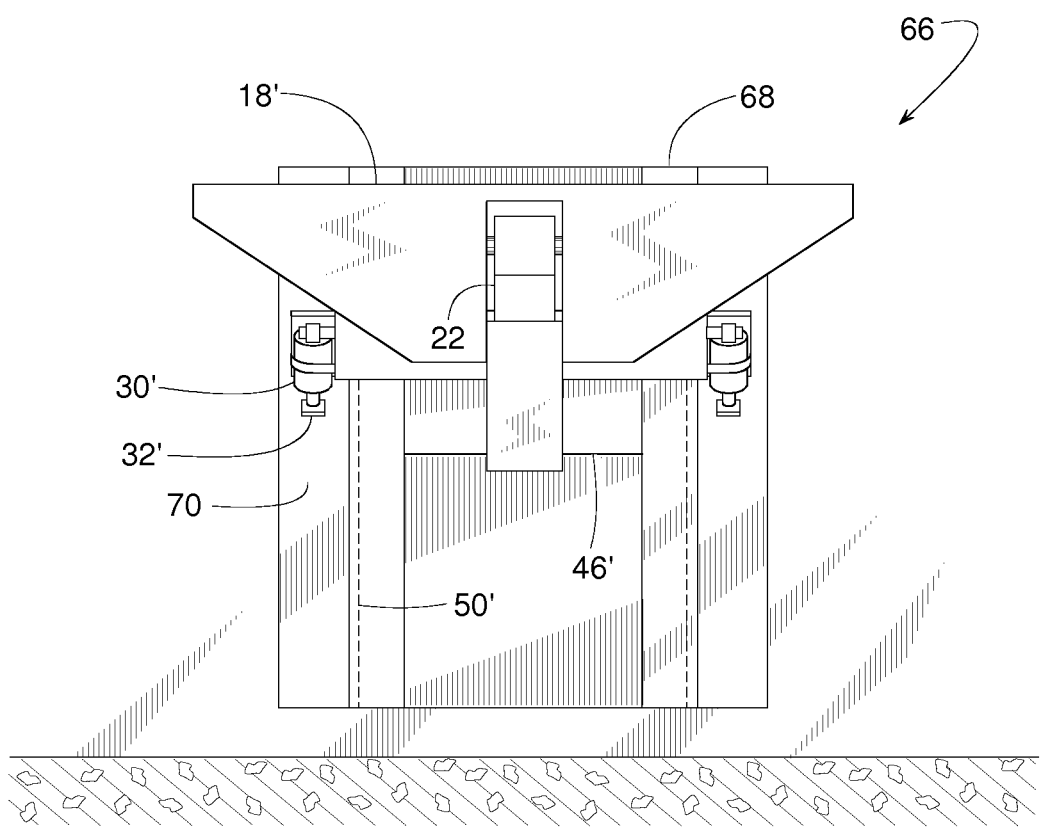
FIG. 8 is a front view of FIG. 7.
Figure 9:
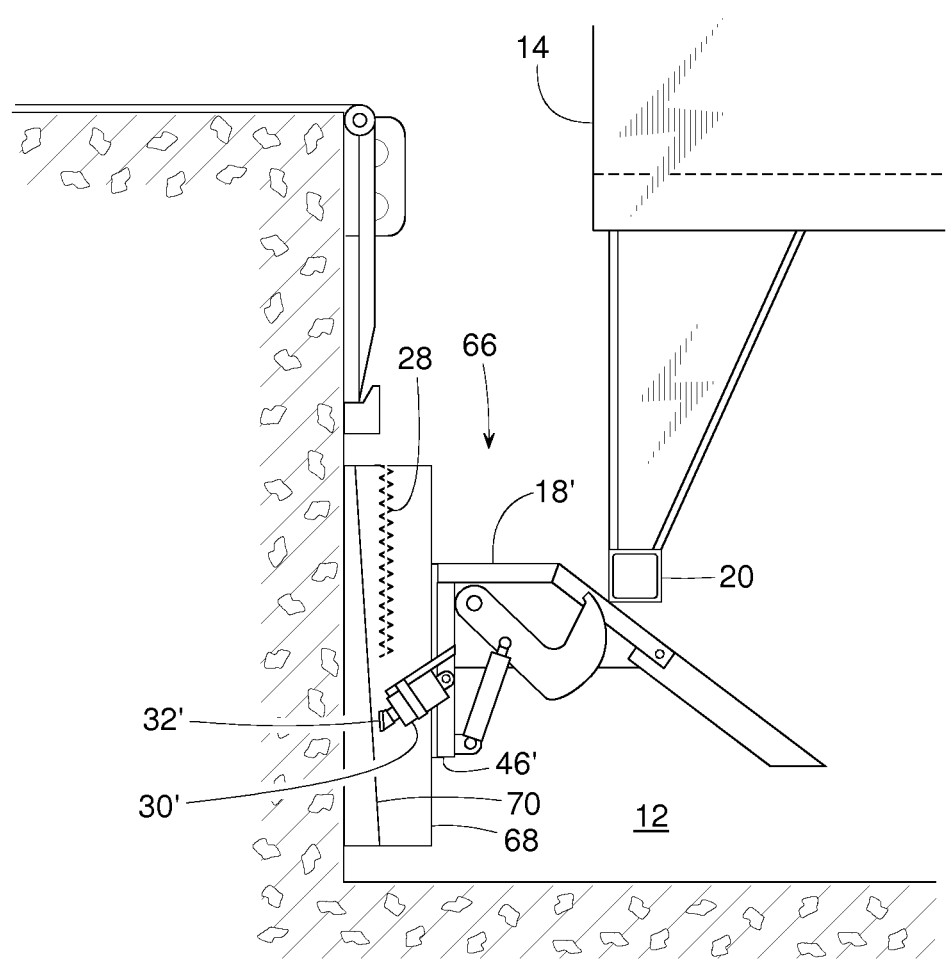
FIG. 9 is a side view similar to FIG. 4 but showing the example vehicle brace of FIG. 7.

In this example, to restrain vehicle 14 from unexpectedly departing dock 12, brace 10 includes an optional barrier 22 that is selectively movable between a stored position (FIGS. 1-4) and a blocking position (FIGS. 5 and 6). When deployed, barrier 22 provides an obstacle to horizontal forward movement of rear impact guard 20, thereby limiting the distance vehicle 14 can freely move away from a generally vertical dock face 24 of dock 12. In some examples the addition of barrier 22 is not employed. The structure and function of brace 10 will be described in more detail with barrier 22 being included as part of brace 10.

Figure 1:
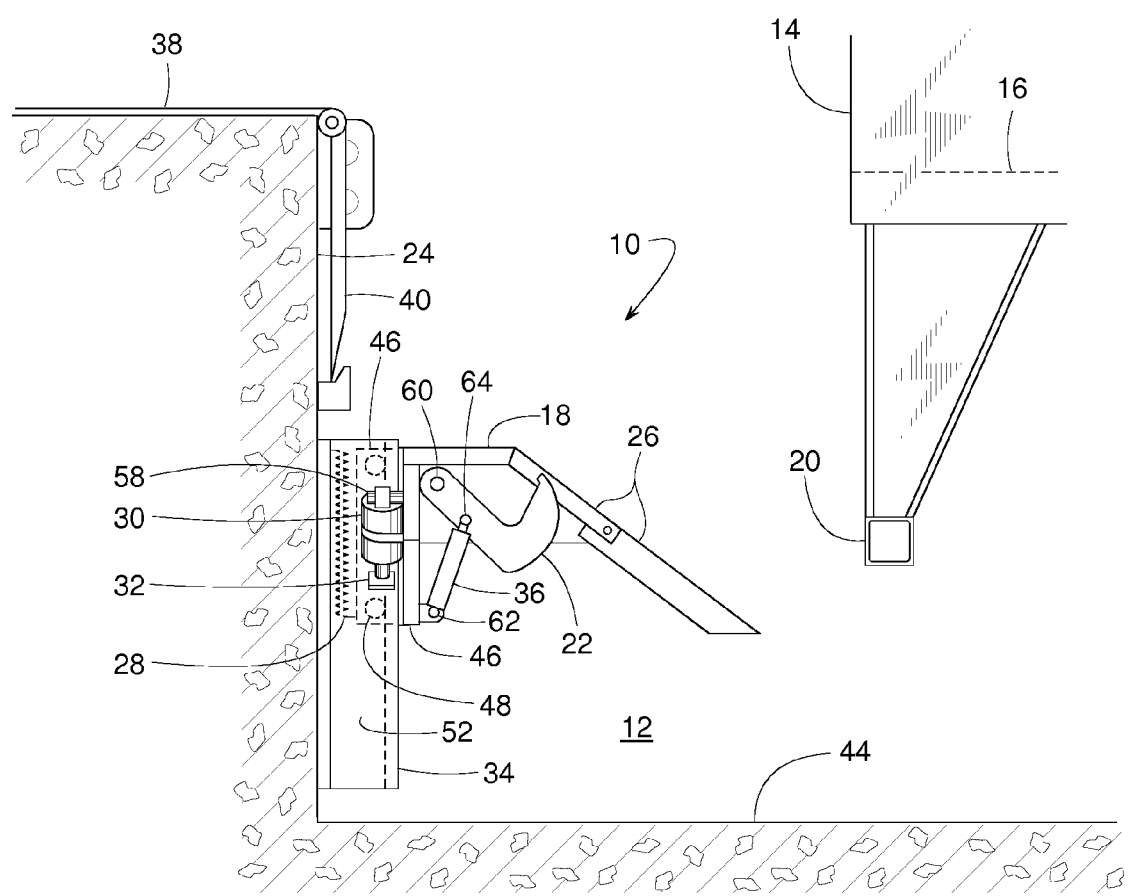
FIG. 1 is a side view of an example vehicle brace disclosed herein having a vehicle support member in a stored position.
Figure 2:
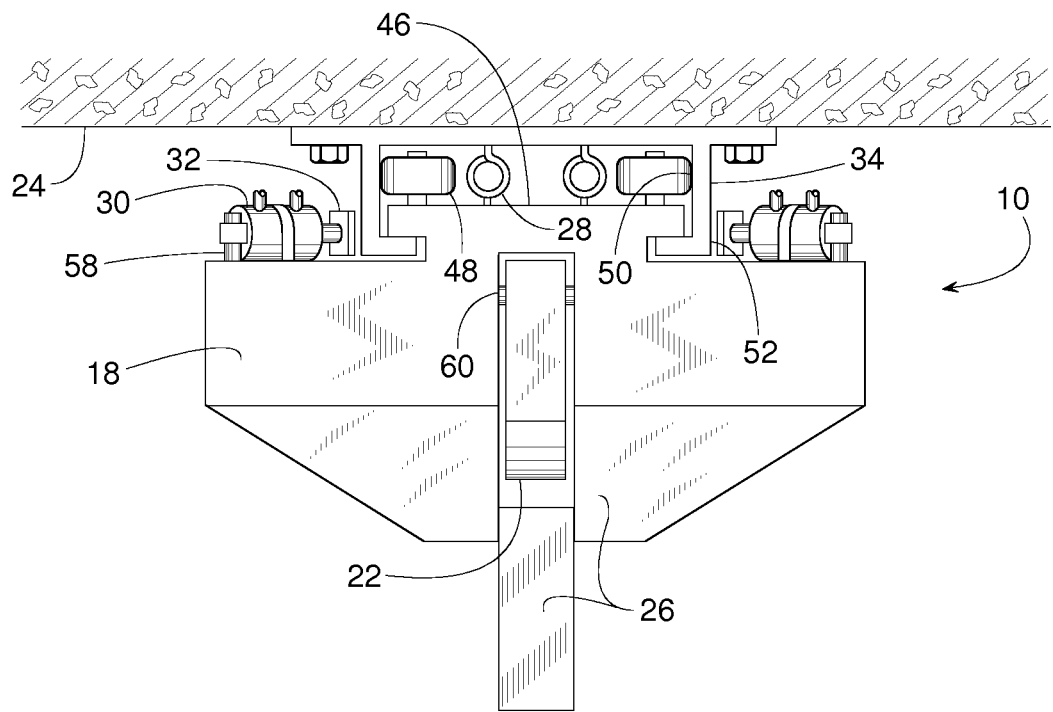
FIG. 2 is a top view of FIG. 1.

The operational use of brace 10 may begin with vehicle 14 backing into dock 12 while vehicle support member 18 is in an elevated stored position, as shown in FIGS. 1, 2 and 3. As vehicle 14 moves its rear impact guard 20 toward and against an inclined lead-in extension 26 of brace 10, as shown in FIG. 4, guard 20 moving toward dock face 24 forces extension 26 and vehicle support member 18 in a downward direction in opposition to a tension spring 28 that urges vehicle support member 18 and extension 26 upward.

When vehicle 14 is within a certain distance of dock face 24, guard 20 will be directly above vehicle support member 18, as shown in FIGS. 5 and 6. Once vehicle 14 and brace 10 are in this position, vehicle brace 10 prevents, reduces and/or substantially minimizes at least the vehicle's downward movement. The vehicle brace 10 includes a brake in the form of a brake actuator 30 and a brake pad 32, which brake can be selectively actuated to prevent, reduce, and/or substantially minimize movement between the vehicle support member 18 and a fixed track system 34. Since guard 20 is engaged on top of support member 18, downward movement of guard 20 is also prevented, or inhibited, as is the movement of the vehicle 14 to which it is attached. To provide this functionality, brake actuator 30 is extended to engage brake pad 32 against fixed track system 34. Different positions of brake pad 32 are illustrated in FIGS. 3 and 6.

In addition to vehicle support member 18 providing guard 20 with vertical support, an actuator 36 can raise barrier 22 to a blocking position to restrain guard 20 and prevent movement of the vehicle 14 away from the loading dock 12. With guard 20 restrained, a dock leveler 38 can extend and rest a lip 40 upon bed 16, as shown in FIG. 5, thereby providing a secure bridge across which cargo can be readily transferred between bed 16 and an elevated platform 42 of dock 12.

Although braces 10 of different size, shape or envelope may be employed, the brace 10 of the illustrated example is preferably configured to be a self-contained unit that can be readily installed without necessarily having to rely on weight bearing support from a driveway surface 44. It may be desirable to mount brace 10 spaced above driveway 44. Driveway 44, for instance, may include a relatively light duty, non-weight bearing water drainage grate directly underneath brace 10; driveway 44 may be sloped or uneven; or driveway 44 may tend to collect dirt, debris, snow, ice and other contaminants that might be difficult to keep clear of brace 10. Such contaminants might be unsightly and/or interfere with the operation of brace 10.

For the illustrated example of FIGS. 1-6, vehicle brace 10 comprises fixed track system 34 secured to dock face 24. A track follower 46 (e.g., a carriage and/or sliding block) is mounted for vertical travel along track system 34. In this example of brace 10, the vertical movement of track follower 46 is guided by track follower 46 having rollers 48 that roll along a guide track surface 50 (FIG. 2) of track system 34.

Vehicle support member 18 extends from track follower 46 such that vehicle support member 18 and the track follower 46 move as a unit vertically along track system 34. Extension spring 28 has an upper end connected to track system 34 and a lower end connected to track follower 46 so that spring 28 urges track follower 46 and vehicle support member 18 upward to the elevated, stored position of FIGS. 1-3. When vehicle 14 is backed into dock 12, rear impact guard 20 moves and/or pushes vehicle support member 18 and track follower 46 down to the operative position of FIGS. 5 and 6.

To maintain brace 10 in the vertical position, and thus to minimize or prevent downward vehicle movement, at least one brake actuator 30 (e.g., hydraulic cylinder, pneumatic cylinder, solenoid, motor, diaphragm, bladder, etc.) is mounted to track follower 46 and/or vehicle support member 18, and brake actuator 30 is operatively coupled to brake pad 32 such that brake actuator 30 can be selectively actuated (e.g., by an operator, via a control system, etc) to move brake pad 32 to a position in which it engages a generally linear brake track surface 52 of track system 34, as shown in FIG. 6. Brake pad 32 being engaged with or pressing tightly against track surface 52 creates a vertical holding force 54 (frictional and/or mechanical reactive force) that resists or impedes a downward force 56 exerted by vehicle 14 pushing bar 20 down against vehicle support member 18. In the illustrated example, the brace 10 includes two laterally movable brake pads 32 that move inward toward each other as brake pads 32 move between a disengaged position (FIG. 3) and an engaged position of FIG. 6.

Brake actuator 30 could be rigidly installed perpendicular to brake track surface 52. However, as shown, brake actuator 30 has at least some pivotal freedom at a mounting pin 58 such that brake actuator 30 lies at an incline or at a non-perpendicular angle relative to brake track surface 52, as best seen in FIGS. 3 and 6. Such an angle provides actuator 30 and brake pad 32 with a binding action that can increase vertical holding force 54 as bar 20 pushes support member 18 downward. Holding force 54, however, should be limited so that if guard 20 exerts a sufficient downward force 56 (i.e., greater than a certain maximum allowable magnitude), brake pad 32 will slip down along surface 52 to allow vehicle support member 18 to descend rather than damaging guard 20 and/or damaging brace 10. With actuator 30 being at a downward angle relative to brake track surface 54, holding force 54 provides greater resistance to downward movement of track follower 46 than upward movement, which might be a benefit in some applications.

In this particular example of brace 10, barrier 22 is in the general shape of a hook that is pivotally connected to track follower 46 via a pin 60. To move barrier 22 between the stored position (FIGS. 1-4) and the blocking position (FIGS. 5 and 6), actuator 36 extends or retracts between an anchor point 62 on track follower 46 and a lift point 64 on barrier 22. Examples of actuator 36 include, but are not limited to, a hydraulic cylinder, pneumatic cylinder, solenoid, motor, diaphragm, bladder, and the like.

To release vehicle 14, actuator 36 retracts barrier 22, and the brake is deactivated by actuator 30 by retracting brake pad 32. To retract brake pad 32, actuator 30 retracts from a holding position (FIG. 6) to a release position (FIG. 3), which moves brake pad 32 from an engaged position (FIG. 6) to a disengaged position (FIG. 3). As vehicle 14 departs, brake pad 32 only needs to retract a short distance from brake track surface 52 in order for track follower 46 to ascend to its elevated stored position under the impetus of spring 28. Thus actuator 30 can be relatively short and compact.

To increase holding force 54, brake track surface 52 can be at an incline rather than parallel relative to the vertical movement of track follower 46 so that as guard 20 forces track follower 46 downward, brake pad 32 gets more tightly pressed against the inclined brake track surface. Although this concept can be readily incorporated into brace 10, such an example inclined brake track design will be described below with reference to a vehicle brace 66 shown in FIGS. 7-10.

As shown in FIGS. 7-10, brace 66 comprises a track system 68 that includes generally vertical guide track surface 50' for guiding a track follower 46' and an inclined brake track surface 70 for holding the vertical position of track follower 46' and its attached vehicle support member 18'. In this case, brake track surface 70 is tilted to lie at an incline relative to guide track surface 50', and brake track surface 70 faces generally forward toward vehicle 14. To hold track follower 46' and vehicle support member 18' at a certain elevation, at least one brake actuator 30' (e.g., hydraulic cylinder, pneumatic cylinder, solenoid, motor, diaphragm, bladder, etc.) is mounted to track follower 46' and/or support member 18'. Actuator 30' travels vertically with track follower 46'. Brake actuator 30' can also extend and retract between a release position (FIGS. 7 and 9) and a holding position (FIG. 10) to respectively move a brake pad 32' between a disengaged position (FIGS. 7 and 9) and an engaged position (FIG. 10) relative to brake track surface 70.

Figure 10:
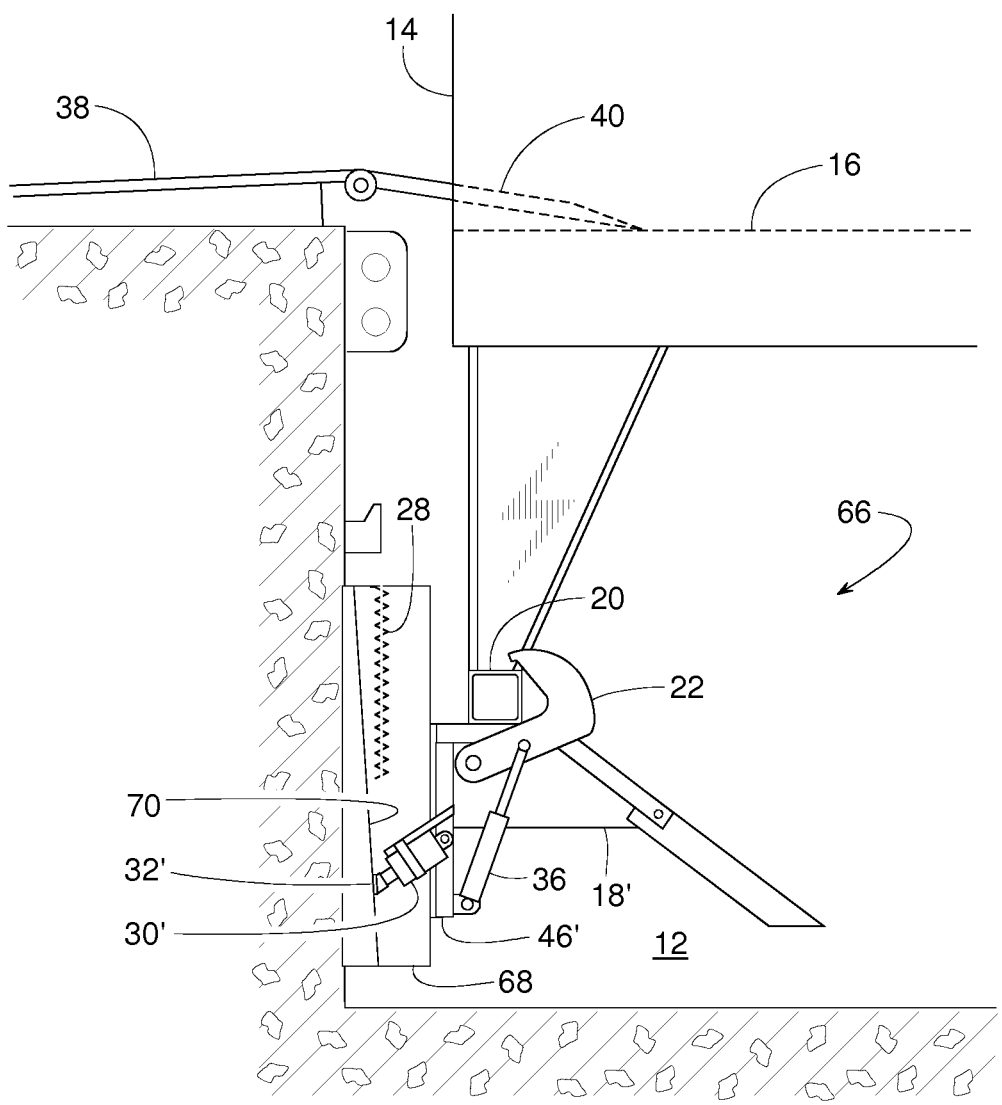
FIG. 10 is a side view similar to FIG. 5 but showing the example vehicle restraint of FIG. 7.

The operation of braces 10 and 66 are similar. In operation, as vehicle 14 backs into dock 12 while brake pad 32' is in the disengaged position, rear impact guard 20 moves or pushes track follower 46' and vehicle support member 18' down (FIG. 9) until guard 20 is directly above support member 18' (FIG. 10). At this point, actuator 30' moves brake pad 32' to the engaged position, and actuator 36 lifts barrier 22 to the blocking position, as shown in FIG. 10. With vehicle 14 now secured, dock leveler 38 can extend and rest its lip 40 on the vehicle's bed 16.

When vehicle 14 is ready to be released, actuator 36 retracts barrier 22, and actuator 30' disengages brake pad 32' from brake track surface 70. As vehicle 14 departs, spring 28' urges track follower 46' and vehicle support member 18' toward the elevated stored position of FIGS. 7 and 8 in a manner similar to the example of FIGS. 1-6.

At least some of the aforementioned vehicle brace examples include one or more features and/or benefits including, but not limited to, the following:

In some examples, a vehicle brace provides a vehicle with vertical support without having to rely on a driveway surface to do so.

In some examples, a vehicle brace includes a brake actuator that is mounted to track follower so that the two move as a unit. With the brake actuator traveling with the track follower, the actuator only needs a short actuation stroke.

In some examples, a brake actuator on a track follower remains at a fixed angular orientation to ensure a brake-clamping force or vertical holding force is uniform regardless of the track follower's location on the track.

In some examples, a vehicle brace includes a brake pad that clamps against a brake track surface lying at an angle, which provides a holding force that is greater than what could be achieved with friction alone (providing all else is equal).

In some examples, a vehicle brace includes separate guide track and brake track surfaces.

In some examples, a vehicle brace includes two lateral brake pads that are actuated generally toward each other against a track system therebetween. In reaction to actuating the brake pads, the brake pad actuators push or pull against a common track follower in generally opposite directions, thus the reaction forces generally oppose each other within the track follower, whereby the track follower avoids transmitting the push/pull reaction force from the track follower to the track.

In some examples, a vehicle brace resists the downward force of a vehicle but only to a limited applied force. To avoid damage, the vehicle brace yields if the vehicle exerts excessive force.

In some examples, the brake resists the track follower's downward movement more than its upward movement.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A vehicle brace for a vehicle that moves substantially vertical in response to the vehicle being loaded or unloaded at a loading dock, the vehicle brace comprising:
   a track system mountable to the loading dock, the track system having a guide track surface and a brake track surface, the brake track surface to lie at an incline relative to the guide track surface;
   a track follower mounted to the track system for movement relative thereto;
   a vehicle support member connected to the track follower to travel therewith, the vehicle support member to engage the vehicle;
   a brake actuator coupled to at least one of the track follower or the vehicle support member to enable the brake actuator to travel with the track follower or the vehicle support member, the brake actuator being movable between a holding position and a release position; and
   a brake pad coupled to the brake actuator, the brake pad to move relative to the brake track surface between a disengaged position and an engaged position in response to the brake actuator moving between the release position and the holding position, the brake pad in the engaged position to press against the brake track surface to resist downward movement of the vehicle support member relative to the track system, and the brake pad in the disengaged position to release the brake track surface to permit movement of the vehicle support member relative to the track system.

2. The vehicle brace of claim 1, wherein the track follower to engage the guide track surface to guide the track follower's movement.

3. The vehicle brace of claim 2, wherein the brake track surface faces generally forward toward the vehicle when the vehicle engages the vehicle support member.

4. The vehicle brace of claim 1, wherein the brake pad further comprises two laterally movable brake pads, wherein a distance between the two laterally movable brake pads changes as the brake pads moves between the engaged position and the disengaged position.

5. The vehicle brace of claim 1, wherein the brake pad in the engaged position provides between the brake pad and the track system a holding force that resists downward movement of the vehicle support member up to a sufficient downward force against the vehicle support member such that, in response to the sufficient downward force, the brake pad slips relative to the track system to allow the vehicle support member to descend relative to the track system without appreciable damage to the vehicle brace.

6. The vehicle brace of claim 5, wherein the holding force is greater in an upward direction than in a downward direction, whereby the brake pad slips more easily upward than downward.

7. The vehicle brace of claim 1, wherein the brake actuator is a hydraulic cylinder.

8. The vehicle brace of claim 1, wherein the brake actuator lies at an incline relative to perfectly vertical.

9. The vehicle brace of claim 1, further comprising a spring coupled to at least one of the track follower and the vehicle support member, the spring to urge the vehicle support member upward.

10. The vehicle brace of claim 1, further comprising a barrier coupled to at least one of the track follower and the vehicle support member, the barrier being vertically movable between a blocking position and a stored position relative to the vehicle support member such that the barrier in the blocking position obstructs horizontal movement of the vehicle away from the dock face when the vehicle is engaged with the vehicle support member, and the barrier in the stored position releases the vehicle to allow movement away from the dock face.

11. The vehicle brace of claim 1, wherein the brake actuator is selectively activated via a control system.

12. A vehicle brace for a vehicle that moves substantially vertically in response to the vehicle being loaded or unloaded at a loading dock that includes a generally vertical dock face, the vehicle brace comprising:
   a track system mountable to the generally vertical dock face, the track system having a brake track surface that is substantially stationary relative to the generally vertical dock face when the track system is mounted thereto, the brake track surface to lie at an incline relative to the generally vertical dock face;
   a track follower mounted to the track system for vertical movement relative thereto;
   a vehicle support member coupled to the track follower to travel therewith, the vehicle support member to engage the vehicle;
   a brake actuator movable between a holding position and a release position; and
   a brake pad coupled to the brake actuator, the brake pad to move relative to the brake track surface between a disengaged position and an engaged position in response to the brake actuator moving between the release position and the holding position, the brake pad in the disengaged position to release the brake track surface to permit movement of the vehicle support member, and the brake pad in the engaged position to press against the brake track surface to create between the brake pad and the brake track surface a vertical holding force to resist movement of the vehicle support member, the vertical holding force to be overcome by the vehicle exerting a sufficient downward force against the vehicle support member such that in response to the sufficient downward force, the brake pad is to slip down along the brake track surface to allow the vehicle support member to descend relative to the track system without appreciable damage to the vehicle brace.

13. The vehicle brace of claim 12, wherein the track system comprises a guide track surface in addition to the brake track surface, the track follower engages the guide track surface to guide the track follower's vertical movement.

14. The vehicle brace of claim 12, wherein the brake track surface faces generally forward toward the vehicle when the vehicle engages the vehicle support member.

15. The vehicle brace of claim 12, wherein the brake pad comprises two laterally movable brake pads, wherein the two laterally movable brake pads move toward each other as the brake pad moves from the disengaged position to the engaged position.

16. The vehicle brace of claim 12, wherein the vertical holding force is greater in an upward direction than in a downward direction, whereby the brake pad slips more easily upward than downward.

17. The vehicle brace of claim 12, further comprising a spring coupled to at least one of the track follower and the vehicle support member, wherein the spring urges the vehicle support member upward.

18. The vehicle brace of claim 12, further comprising a barrier coupled to at least one of the track follower and the vehicle support member, the barrier being vertically movable between a blocking position and a stored position relative to the vehicle support member such that the barrier in the blocking position provides an obstruction that prevents the vehicle from moving forward unobstructed away from the generally vertical dock face when the vehicle is engaged with the vehicle support member, and the barrier in the stored position releases the vehicle in the forward, horizontal direction.

19. A vehicle brace for a vehicle that tends to move vertically in response to being loaded or unloaded at a loading dock that includes a generally vertical dock face, the vehicle brace comprising:
   a track system mountable to the dock face, the track system having a brake track surface and a guide track surface that are fixed relative to the dock face when the track system is mounted to the dock face;
   a track follower mounted to the track system for vertical movement relative thereto, the vertical movement being guided by the guide track surface;
   a vehicle support member coupled to the track follower, the vehicle support member is adapted to engage the vehicle; and
   a brake system having a brake actuator and a brake pad, the brake actuator being movable between a holding position and a release position, the brake pad coupled to the brake actuator such that the brake pad moves between a disengaged position to release the brake track surface and an engaged position to engage the brake track surface in response to the brake actuator moving between the release position and the holding position, the disengaged position to permit vertical movement of the vehicle support member free from any braking forces imparted to the brake track surface by the brake system, the engaged position to provide a vertical holding force that resists downward movement of the vehicle support member up to a sufficient downward force against the vehicle support member such that in response to the sufficient downward force, the brake pad is to slip along the brake track surface to allow the vehicle support member to descend relative to the track system without appreciable damage to the vehicle brace.

20. The vehicle brace of claim 19, wherein the brake track surface is at an incline angle relative to the guide track surface.

21. The vehicle brace of claim 19, further comprising a spring coupled to at least one of the track follower and the vehicle support member, the spring to urge the vehicle support member toward an upward direction.

22. The vehicle brace of claim 19, further comprising a barrier coupled to at least one of the track follower or the vehicle support member, the barrier being vertically movable between a blocking position and a stored position relative to the vehicle support member such that the barrier in the blocking position obstructs horizontal movement of the vehicle when the vehicle is engaged with the vehicle support member, and the barrier in the stored position releases the vehicle in the horizontal direction.

23. The vehicle brace of claim 19, wherein the brake pad comprises two laterally movable brake pads, the two laterally movable brake pads to move toward each other as the brake pad moves from the disengaged position to the engaged position.

24. The vehicle brace of claim 19, wherein the brake actuator is positioned at a non-perpendicular angle relative to the brake track surface.

25. The vehicle brace of claim 19, wherein the brake actuator is coupled to at least one of the track follower or the vehicle support member such that the brake actuator travels vertically with the track follower or the vehicle support member, respectively.

* * * * *

UNITED STATES PATENT AND TRADEMARK OFFICE
CERTIFICATE OF CORRECTION

PATENT NO. : 8,678,736 B2  
APPLICATION NO. : 12/752636  
DATED : March 25, 2014  
INVENTOR(S) : Andersen et al.

Page 1 of 1

It is certified that error appears in the above-identified patent and that said Letters Patent is hereby corrected as shown below:

In the Claims

Column 8, line 58 (claim 20), delete "angle" between "incline" and "relative".

Signed and Sealed this  
Third Day of June, 2014

Michelle K. Lee  
*Deputy Director of the United States Patent and Trademark Office*